United States Patent [19]

Nelles

[11] Patent Number: 4,815,368
[45] Date of Patent: Mar. 28, 1989

[54] CHEESE BRINING SYSTEM

[76] Inventor: Jakob Nelles, R.R. 3, Box 100, Maquoketa, Iowa 52060

[21] Appl. No.: 47,937

[22] Filed: May 6, 1987

[51] Int. Cl.$^4$ .................. A01J 25/00; A23C 19/00
[52] U.S. Cl. .................................... 99/452; 99/535
[58] Field of Search ............. 99/452, 453, 454, 455, 99/456, 460, 535, 516, 517; 426/361, 582, 36, 512; 62/394

[56] References Cited

U.S. PATENT DOCUMENTS

| | | | |
|---|---|---|---|
| 3,910,174 | 10/1975 | Nelles | 99/452 |
| 4,068,014 | 1/1978 | Heimbruch | 99/535 X |
| 4,198,902 | 4/1980 | Worden | 99/535 |
| 4,206,238 | 6/1980 | Rothenbuhler | 426/36 |
| 4,339,468 | 7/1982 | Kielsmeier | 426/582 |

Primary Examiner—Timothy F. Simone
Attorney, Agent, or Firm—Quarles & Brady

[57] ABSTRACT

A system for brining buoyant cheese, such as provolone, includes a brining pit surrounded by a brine-filled canal. A large capacity Archimedian screw pump drives a stream of brine in the canal. A plurality of cages are suspended in the brining pit separated from the canal by doors. A retractable gate is hinged next to each door. Blocks of cheese deposited in the canal float with the stream until deflected into the cage by an opened gate. The loaded cages are submerged, and continually washed by vertical currents of filtered, sterilized, reconstituted and cooled brine that is forced into the bottom of the brining pit. When brining and cooling are completed, the cages are raised and doors opened, allowing the brine streams to carry the cheese out into the canal where it is removed.

8 Claims, 6 Drawing Sheets

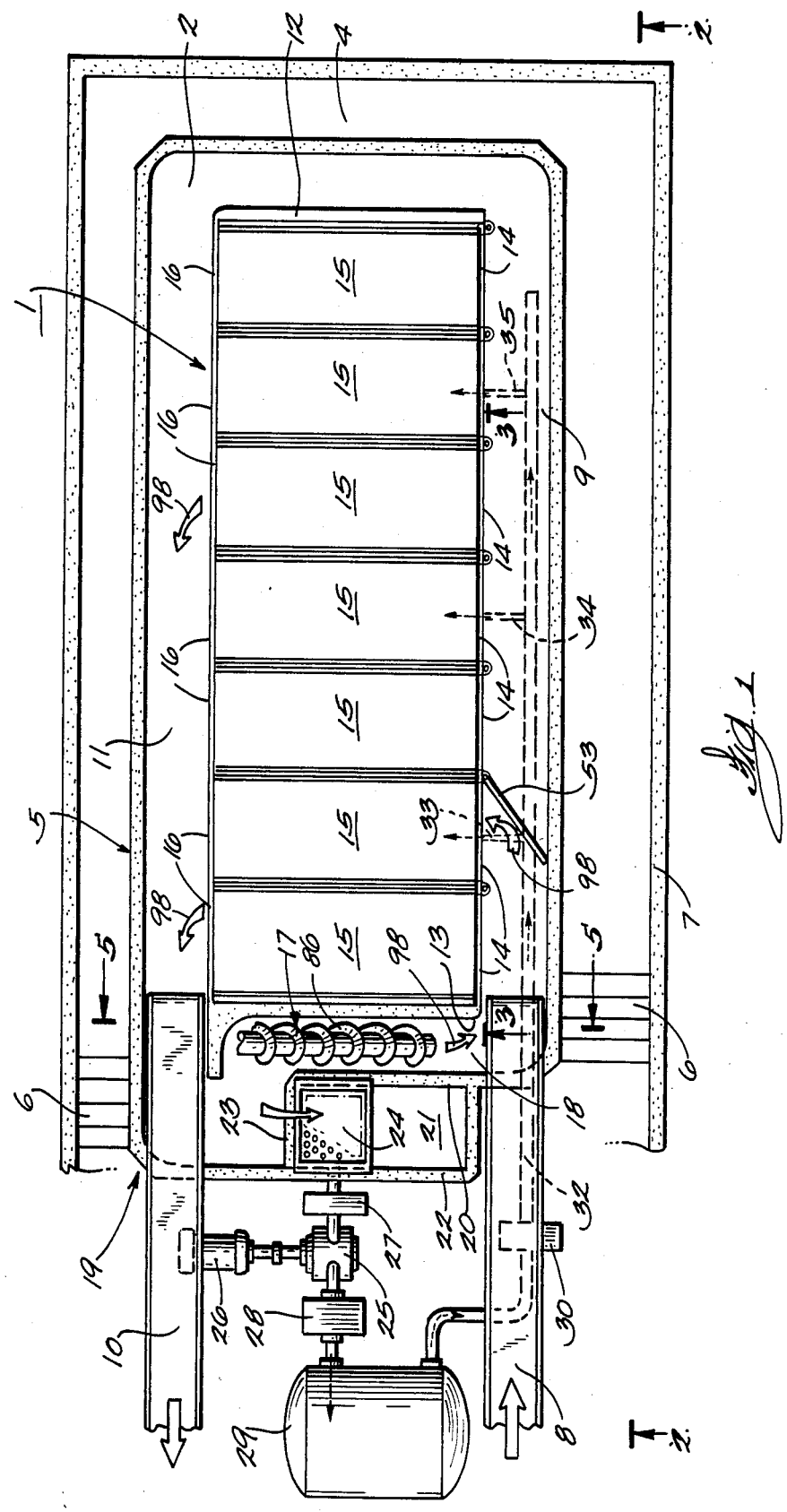

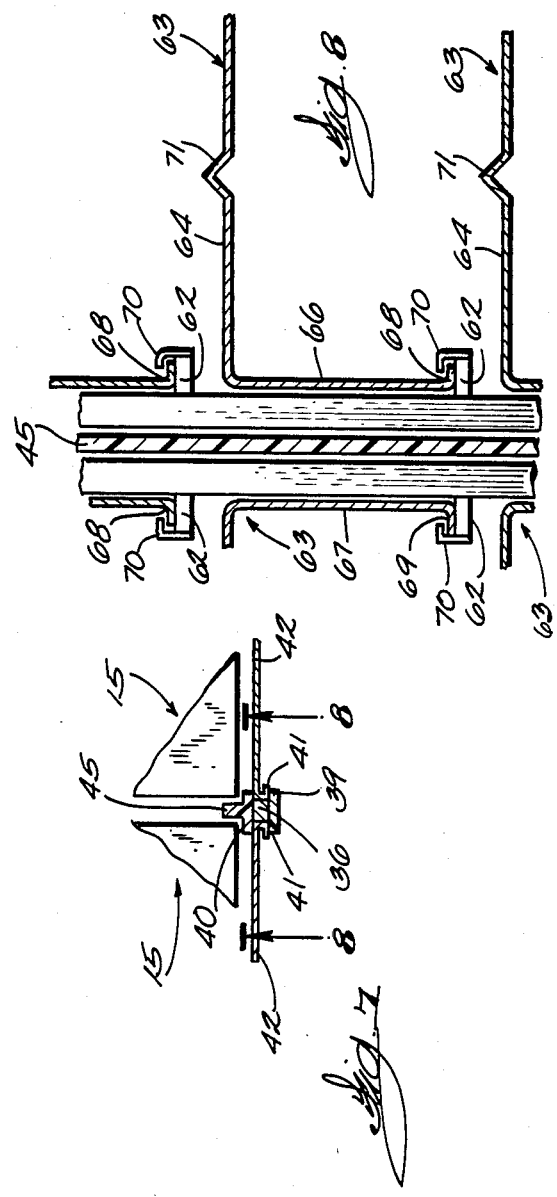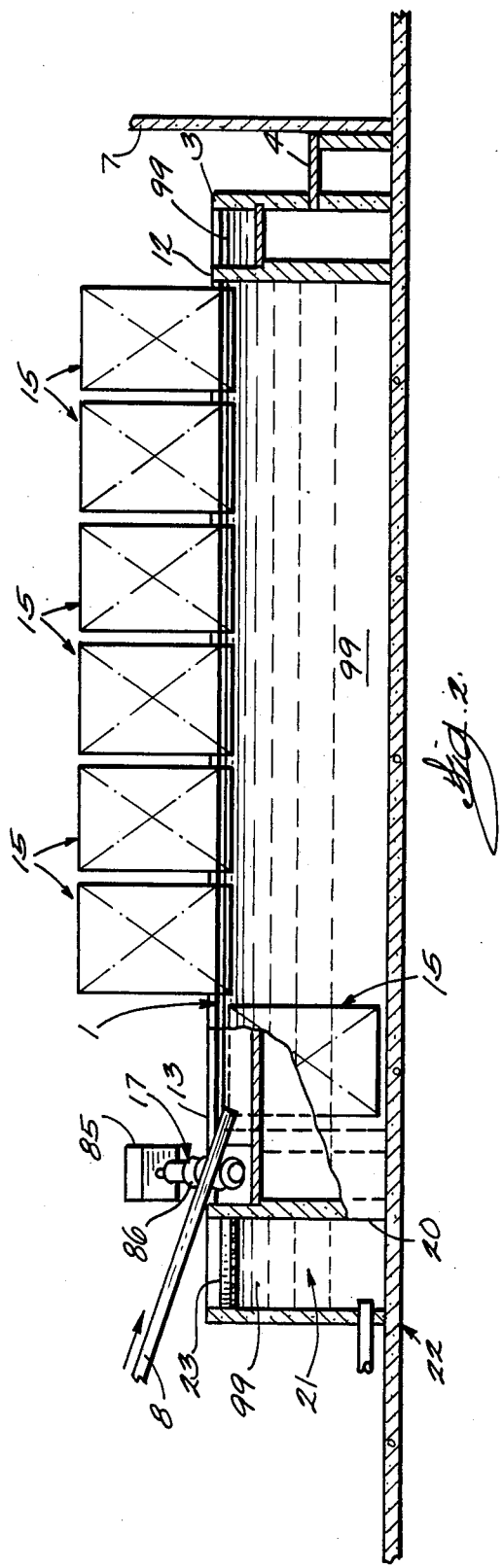

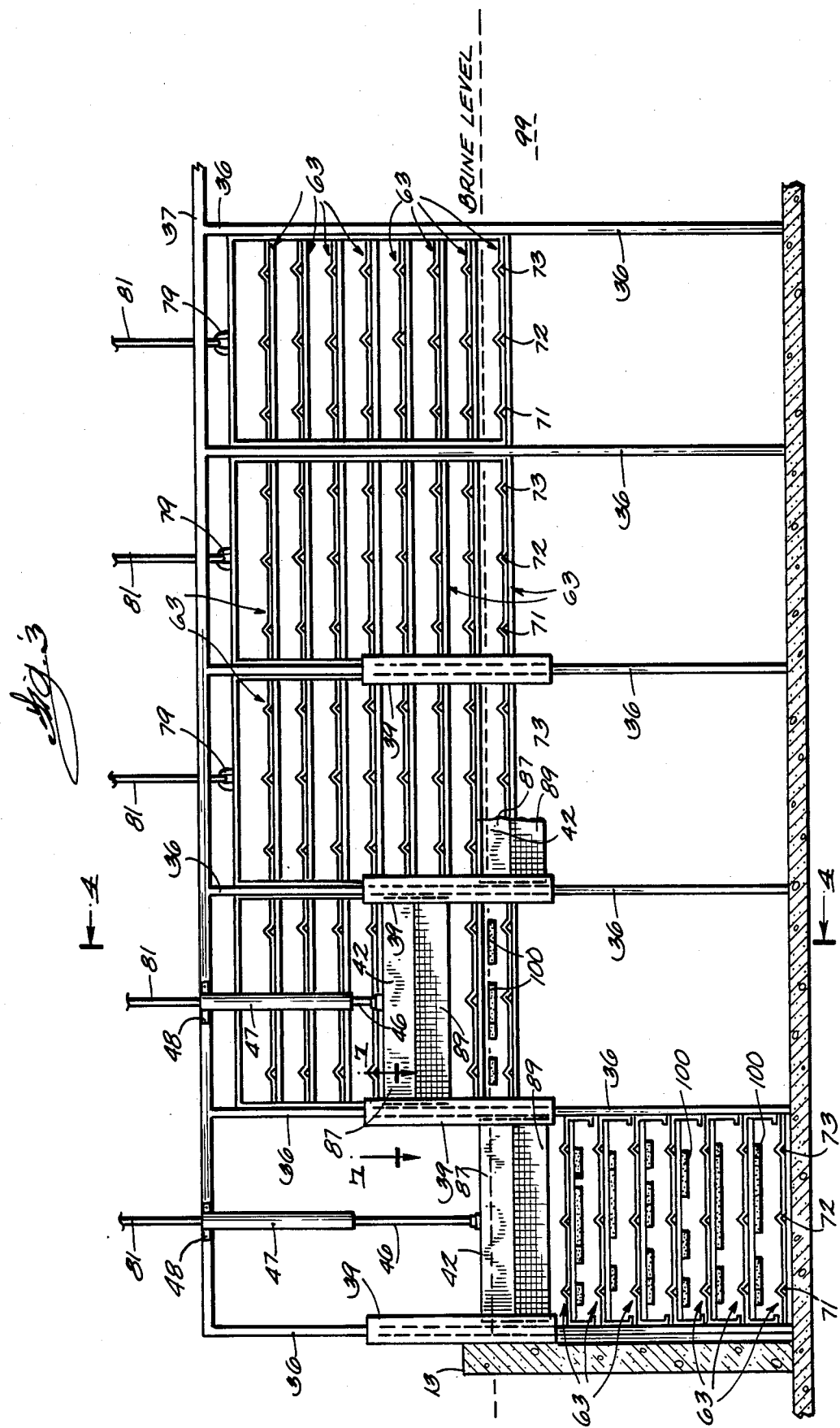

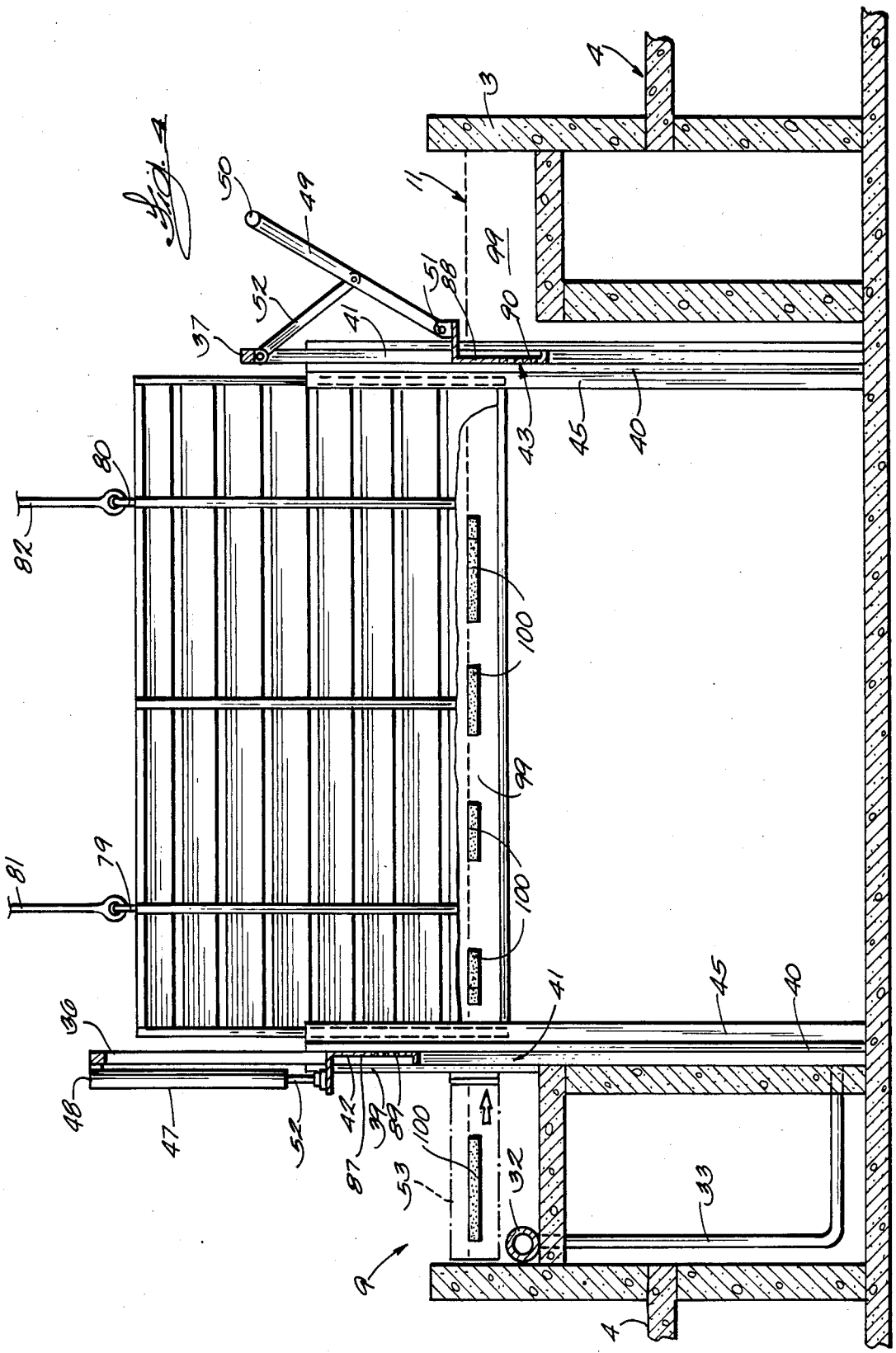

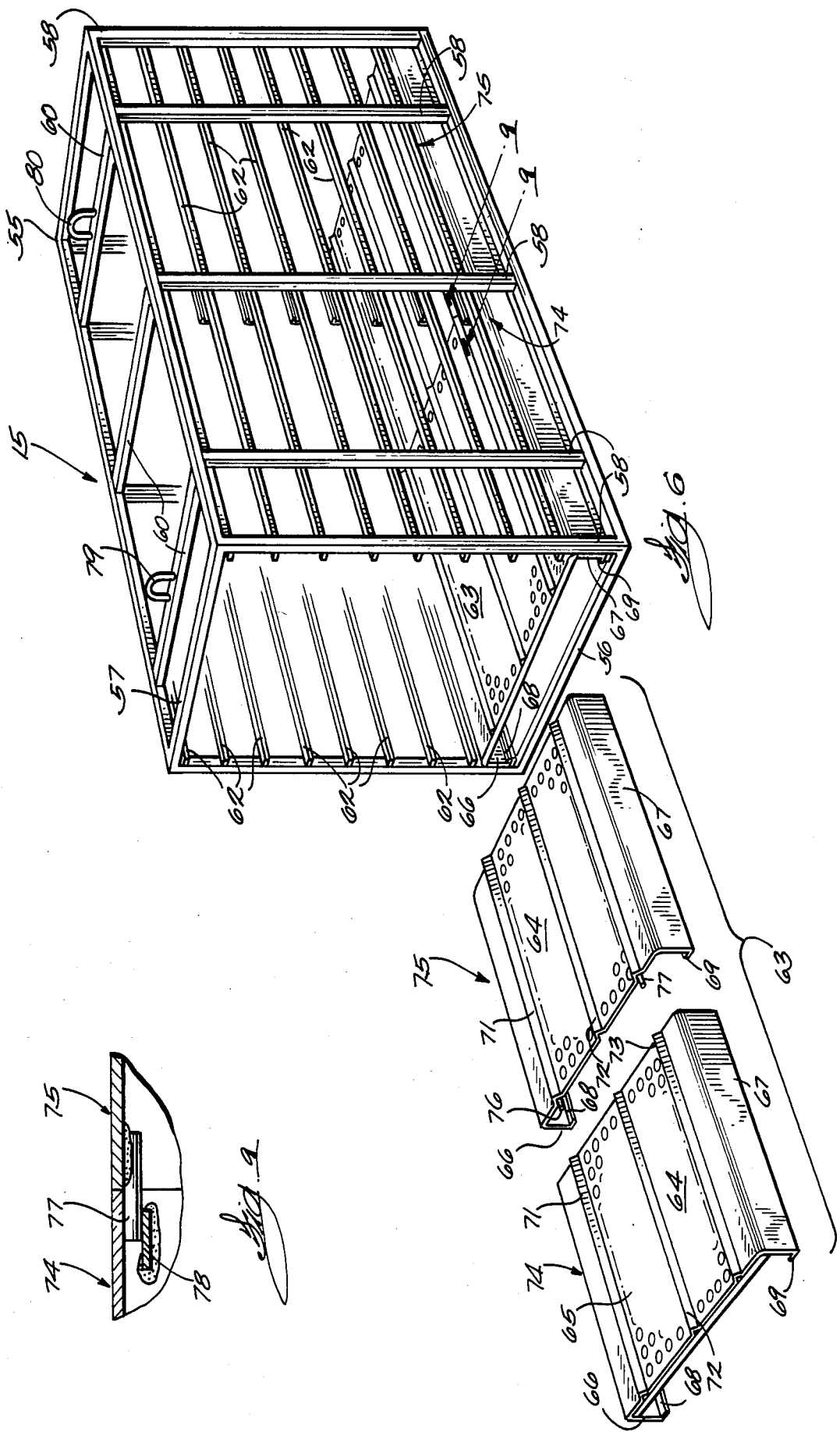

CHEESE BRINING SYSTEM

BACKGROUND OF THE INVENTION

On Jan. 10, 1973, this applicant applied for a U.S. patent for his invention of a system for cooling and curing semisoft Italian cheeses, and that application issued into U.S. Pat. No. 3,910,174 on Oct. 7, 1975. Prior to that invention, the critical step of brining and cooling semisoft Italian cheeses, such as provolone cheese, was performed entirely manually. The bouyant blocks of cheese were floated in a tank of brine, and though the blocks of cheese were sometimes weighted to submerge as much as possible of the cheese, the blocks of cheese needed to be turned by hand at regular intervals.

Before applicant's invention of U.S. Pat. No. 3,910,174, to achieve the cooling necessary to stop microbial action the brine was refrigerated and the ambient air cooled in an effort to cool the parts of the blocks of cheese floating above the brine. However, the tendency of heated fluid to rise held the cheese-warmed brine at the top around the floating blocks of cheese, while entrapping the cooled brine at the bottom, so that cooling was very inefficient, and too often ineffective. Without sufficient cooling, cheese quality deteriorates rapidly.

Because the brine was prepared in the vat before U.S. Pat. No. 3,910,174, much of the salt added either never went in solution, or precipitated out on the bottom of the vat, causing excessive salt usage, varying and unpredictable salinity of the brine, and consequent lack of effective control over and uniformity of brining. Also, impurities from the salt together with bits of cheese and fat accumulated in the vats, and these decomposed under the action of molds and other microorganisms to contaminate the brine, requiring that the vat be periodically emptied, the brine discarded, and the vat scrubbed out before being recharged with fresh brine.

In summary, the art before the invention of U.S. Pat. No. 3,910,174 was characterized by excessive labor demands, excessive space requirements, excessive energy consumption, and excessive salt usage, and produced widely varying and uncontrollable product quality.

The invention of U.S. Pat. No. 3,910,174 overcame much of those defects. It provided a brining pit with an overflow tank that was connected to a separate brine mixing tank with filtration, pasteurization, and refrigeration apparatus connected to it so that the brine could be continually cleaned, reconstituted, refrigerated and recirculated to provide a more uniform optimal salt content, temperature and much improved cleanliness. U.S. Pat. No. 3,910,174 also teaches the use of large racks which could be loaded with blocks of cheese adjacent to the brining pit, and then carried by an overhead crane to the brining pit and submerged in the brine so that the blocks of cheese would be continuously and entirely immersed in brine, eliminating the need to turn blocks. By utilizing the full depth of the brining pit, the invention of U.S. Pat. No. 3,910,174 vastly increased the productive capacity of the brining pit.

However, a decade and a half's experience with the brining system of U.S. Pat. No. 3,910,174 has revealed to applicant opportunity for substantial improvements. A need developed to enlarge the capacity of the brining system substantially without incurring the high capital costs of heavy equipment required by the invention of U.S. Pat. No. 3,910,174. Also, a brining system was needed that could automate the brining step of cheese manufacturing, and thereby eliminate or minimize the human element, as a source of both error as well as cost. Finally, more perfect uniformity and control of temperature, brine concentration and brine purity was needed to perfect the uniformity of the product and quality control. The present invention satisfies those needs.

SUMMARY OF THE INVENTION

The present invention relates to a system for brining and cooling cheese, and more particularly the invention resides in a brining pit having premixed and precooled brine circulating through it and a cage having a frame supporting at least two horizontal, spaced apart perforated shelves for trapping between them blocks of cheese to be brined and cooled, and having a loading end and a discharge end; means for submerging the cage in the circulating brine and lifting the cage out of the circulating brine; means for loading and unloading said blocks of cheese into and out of said cage; a delivery means for delivering blocks of cheese to the loading end of the cage, means for inserting said blocks of cheese between said perforated shelves through said loading end, means for discharging said blocks of cheese from between said perforated shelves through said discharge end, and means to carry blocks of cheese away from the discharge end of said cage.

The invention also resides in the creation of brine-filled canals adjacent to said brining pit adjacent the loading and discharge ends of said cage and propulsion means for creating streams in the brine in said canals to provide means for floating blocks of cheese to the loading end of said cage, for conveying blocks of cheese into said loading end and through and out said discharge end of said cage, and means for removing said blocks of cheese upon completion of cooling and brining. The invention also resides in a brine reservoir adjacent to and sharing a common wall with said brining pit, which common wall has a weir portion recessed below the level of the brine to allow the surface layer of the circulating brine together with any floating foreign material to overflow into said reservoir, and in a recirculation circuit to receive said brine from said reservoir and pump it through filtration means, sterilization means, a brine make-up tank, a brine cooling apparatus and back to a manifold that ejects the cleaned, sterilized, reconstituted and cooled brine under pressure into the brining pit at selected locations in the bottom of the pit.

The foregoing invention is founded upon the perception that the buoyancy of semisoft Italian cheeses, which had been a principal obstacle to the efficient and effective brining and cooling of that cheese before the invention of U.S. Pat. No. 3,910,174, can be used to facilitate, ease, automate and simplify the handling and brining of the cheese. After the semisoft, Italian style cheese, such as provolone cheese, has been made and formed, typically into bricks, six-pound loaves or twenty-pound slabs, it is carried by conveyor belts or other suitable means to the brining tank where it is deposited in canals formed parallel to the sides of and contiguous with the brining pit. A large capacity pump or propellors impart a current to the brine creating flow streams of brine in the canals which transport the floating blocks of cheese to desired locations adjacent to the brining pit. A gate is extended obliquely across the canal to guide the blocks of cheese toward the center of the brining tank and into the cage.

The rack shown in U.S. Pat. No. 3,910,174 is a heavy structure built to support a full load of cheese outside of the brining pit, and then to be lifted by an overhead crane, carried to the brining pit and lowered into the brine where it remains submerged for the time requisite to cool and brine the cheese, after which it was hoisted out of the brining pit, and conveyed away to be unloaded outside of the brining tank. By contrast, the cage of the present invention never supports the cheese and never leaves the brining pit. Consequently it can be constructed of a lightweight, stainless steel, tubular framework, the vertical members of which support inwardly projecting horizontal ledges, on which removable, perforated, stainless steel shelves rest. The shelves do not support the cheese since the blocks of cheese are bouyant and supported by he brine. Instead, the shelves divide the space in the cage into stacked, horizontal compartments.

In a brining system according to the present invention, the blocks of cheese are floated into those compartments in the cage, and floated out again when brining and cooling are completed. To load the cage, it is hoisted up until the bottom compartment is partially above and partially below the surface of the brine so blocks of cheese can float into it, carried by the current of the stream of brine. As each compartment is filled in the same manner, the cage is lowered to present the next compartment until all compartments are filled and the cage completely submerged. To unload the cage, it is hoisted until first the top compartment emerges above the surface of the brine, and the cheese is floated out of it. Then the cage is raised again until the next compartment emerges above the surface so its load of cheese can be floated out. The cage is thus raised and emptied by compartments until completely emptied.

Since the cages never bear the weight of the cheese, the present invention imposes practically no size limits on the installation, except the cheese maker's capacity requirements, and the space available. A single brining pit may hold as many cages as desired. Since the cages are loaded and unloaded individually, each batch of cheese made is separately brined, maximizing product and quality control. The brining can be completely automated, but if manually operated, requires only one operator.

In addition to the brine stream created by the large capacity pump in the canals to transport the cheese, the brine is also constantly circulated vertically through the pit by another brine circuit. A brine reservoir sharing a common wall with the end of the brining tank has a portion of the common wall recessed below the level of the brine to create an overflow weir, which skims off the top layer of the circulating brine taking with it all floating impurities, such as globules of fat and pieces of cheese. The floating impurities are sifted out of the brine, which is pumped out of the reservoir and through a circuit to purify, sterilize, reconstitute and cool the brine. The regenerated brine is then pumped back through a manifold from which it is discharged into the bottom of the brining pit at spaced locations. The constant discharge of restored brine at the bottom of the brining pit forces the cooled brine upward in the pit to the surface, where it joins the horizontally circulating stream that transports the blocks of cheese. As the brine flows vertically upward it brines and cools the cheese, and carries loose particles and impurities to the surface. Thus the present invention maintains the brine at a constant temperature and concentration at all times and location in the brining pit, and it constantly cleans and purifies the brine. This ensures higher product quality and uniformity.

These and other objects and advantages of the present invention will become apparent in the following description of the preferred embodiment of the invention.

BRIEF DESCRIPTION OF THE DRAWING

In the drawings:

FIG. 1 is a top plan view of a brining tank and apparatus embodying the present invention.

FIG. 2 is a side elevation of the embodiment shown in FIG. 1 taken along the line 2—2 in FIG. 1.

FIG. 3 is a side elevation in section of the brining pit with cages of the embodiment of the present invention shown in FIG. 1.

FIG. 4 is a cross-sectional view in elevation of the embodiment shown in FIG. 3 taken along the lines 4—4 in FIG. 3.

FIG. 6 is an exploded perspective view of a cage embodying the present invention with one complete shelf in place and a second shelf disassembled into its two parts outside of the frame.

FIG. 7 is a fragmentary top plan view in section of a portion of the brining pit and cages taken along the line 7—7 in FIG. 3 showing the guides for the cages and portions of the end doors in front of the entry and of the cages.

FIG. 8 is a side elevation and section of the structure shown in FIG. 7 and FIG. 3 taken along the line 8—8 in FIG. 7 showing a portion of the ends of two cages and illustrating the mounting of the shelves in the cages.

FIG. 9 is a partial view in section of the joining of two shelf members taken along the line 9—9 in FIG. 6.

Figure 10:
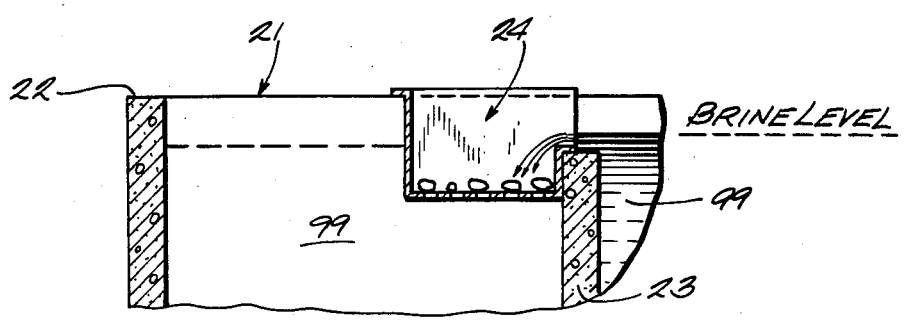
FIG. 10 is a fragmentary side elevation in section taken along the line 10—10 in FIG. 1 and illustrating the recessed wall of the brine reservoir that serves as a weir over which the brine flows firmly flume on the brining tank into the reservoir.
Figure 5:
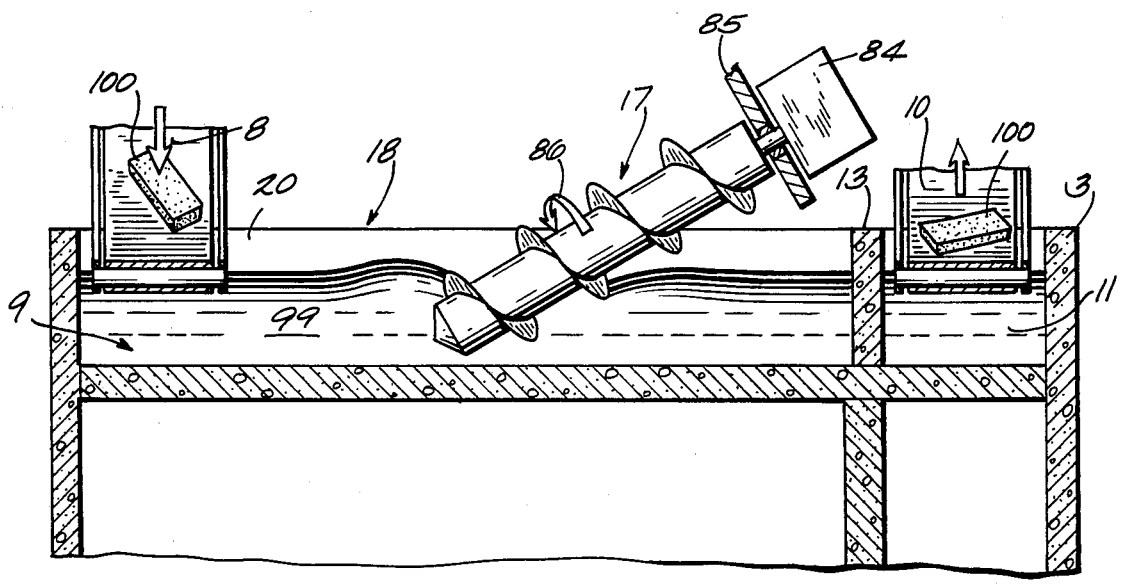
FIG. 5 is a partial cross-section in elevation taken along the line 5—5 in FIG. 1 showing the pump for driving the stream in the canals and showing the conveyor belts carrying the blocks of cheese to and from the brining pit.

In the embodiment of the present invention illustrated by FIG. 1, a brining pit 1 is shown surrounded by a relatively shallow canal 2, the two being contained within outside wall 3 of brining tank 5. Although the size of the brining pit 1 will vary with the capacity required and the space available, a brining pit 1 six feet deep, 40 feet long and 7 feet wide would be deemed ordinary.

A raised walkway 4 reached by stairs 6 is constructed around the brining tank 5 to provide access to the brining tank 5. Alternatively, the brining pit 1 could be recessed in the floor 22 of the brining room, obviating the need for a raised walkway 4 and also providing more insulation around the brining pit 1 to stabilize further the temperature of the brine. The walkway 4 extends to the brining room walls 7.

A loading conveyor belt 8 carries blocks of cheese 100 from a cooling tank (not shown) to a loading canal 9, which is a portion of the canal 2. A discharge conveyor belt 10 withdraws the blocks of cheese 100 from a discharge canal 11, which is the part of canal 2 on the opposite side of brining pit 1 from the loading canal 9. The discharge conveyor belt 10 carries the blocks of cheese 100 from the discharge canal 11 away from the brining tank 5 to a washer (not shown) and from there to the cheese wrapping machine (not shown).

The canal 2, including the loading canal 9 and discharge canal 11 is bounded on the outside by the tank wall 3. The inside of the canal 2 is bounded on the ends by blind end dike 12 and access end dike 13. Between the end dikes 12 and 13, the inside boundaries of the canal 2 are created by seven loading doors 14 that define the inside of the loading canal 9 along the edge of the brining pit 1. Seven discharge doors 16 make up the inside boundary of the discharge canal 11 along the opposite side of the brining pit 1. Between each pair of loading and discharge doors 14 and 16, a cage 15 is located so that it can be raised out of and lowered into the brining pit 1.

A large capacity Archimedian screw pump 17 is mounted in an end canal 18 at the access end 19 of the brining tank 5, joining the loading and discharge canals 9 and 11. The pump 17 drives the stream of brine 99 in the canal 2 as represented by arrows 98 in the drawing. The pump 17 is driven by a variable speed hydraulic motor 84, and in this embodiment is capable of moving up to 3,000 gallons of brine 99 per minute. The hydraulic motor 84 and screw 86 of pump 17 are supported by a journal bearing 85 so that the motor 84 and bearing 85 are well above the brine 99 and only the easily sanitized screw 86 projects into the brine 99.

Next to and sharing a common wall 20 with the access end canal 18 is a brine reservoir 21. A recessed overflow weir 23 joins the common wall 20 of the canal 18 and brining tank wall 3 so that part of the brine 99 entering the end canal 18 from the discharge canal 11 can spill into the brine reservoir 21. Resting across the top of the brine reservoir 21 adjacent to the weir 23 is a perforated stainless steel basket 24 which serves as the first filter for the brine as it spills from the access end canal 18 into the reservoir 21.

Brine 99 is drawn from the reservoir 21 by a pump 25 that is driven by a motor 26. The brine 99 coming from reservoir 21 passes through a fine filter 27 which removes all solid impurities. Next the brine 99 passes through an ultraviolet light sterilizer 28, which destroys any microorganisms that may contaminate the brine 99. From the ultraviolet light sterilizer 28, the brine 99 passes into a brine make-up tank 29, where salt is added, if necessary, to restore the concentration of the brine 99. The brine make-up tank 29 is equipped to mix the salt completely into the solution, so any insoluable impurities in the salt precipitate out in the make-up tank 29 and never reach the brining pit 1. The addition of salt to the brine 99 may be automatically controlled by a feedback system utilizing a salination sensor, or by a program which calculates the amount of salt consumed by the volume of cheese that has been brined and adds sufficient amount of salt to restore the desired concentration. From the brine make-up tank 29, the brine 99 is pumped through a heat exchanger 30 connected to a refrigeration unit (not shown), which is thermostatically controlled, to reduce the temperature of the brine 99 to a desired temperature to cool the blocks of cheese 100 rapidly.

From the heat exchanger 30, the cleaned, sterilized, reconstituted and cooled brine 99 is pumped to a manifold pipe 32 located beneath the loading canal 9 and extending the length of the brining pit 1. The manifold pipe 32 has a plurality of outlet nozzles 33, 34 and 35 which extend from it, and open along the bottom of the brining pit 1 at spaced intervals. The cool brine 99 is ejected through the nozzles 33, 34 and 35 into the bottom of the brining pit 1 with sufficient force to overcome the tendency of the cooler fluid to remain at the bottom. This forces the cooler brine 99 to flow upward through the cages 15, surrounding the blocks of cheese 100 held in the cages 15 as described below.

A stainless steel framework consisting of vertical stanchions 36, which are made of square cross-section stainless steel tubing, anchored to the walls of the brining pit 1, and joined at the top by horizontal side beams 37 provides support and guidance for the movable parts of the brining apparatus. In addition to the vertical stanchions 36 at each end of the brining tank 5, one vertical stanchion 36 is provided between each pair of adjacent cages 15.

Plastic planks 39 and 40 are bolted to the outside and inside surfaces, respectively, of each vertical stanchion 36 to define between them guide channels 41 for the vertically sliding loading and discharge doors 14 and 16, respectively, adjacent to loading and discharge ends 43 and 44, respectively, of the cages 15. The outside guide plank 39 extends from the floor of the loading and discharge canals 9 or 11, respectively, to a height slightly higher than the top of each door 14 or 16 at the peak of its travel, and the inside guide plank 40 extends from the floor of the brining pit 1 to the same height as the outside guide plank 39.

A plastic rail 45 fastened to the center of the inside door guide plank 40 extends at a right angle from the inside door guide 40 towards the center of the brining pit 1 from the bottom to the top of the inside door guide plank 40. The plastic rail 45 together with the inside door guide 40 thus provide right angle corner guides for each corner of each cage 15 to guide its vertical travel in and out of the brine 99.

Each sliding loading door 14 across the entry end 43 of the cage 15 is secured to the end of the piston rod 46 of a pneumatic cylinder 47, the blind end 48 of which is fastened to the horizontal side beam 37. In the preferred embodiment, the pneumatic cylinders 47 are double acting cylinders connected in the conventional fashion to a conventional pneumatic circuit that has controls (not shown) conveniently located for the operator to actuate the cylinders 47 to raise and lower the loading doors 14 individually, to allow blocks of cheese 100 to be carried by the streams 98 of brine 99 into the cages 15. Hydraulic cylinders connected with a hydraulic circuit could also be used in place of the pnuematic cylinders 47, as could rotary hydraulic motors, or electric motors.

In the preferred embodiment, the sliding discharge doors 16 opposite the exit ends 44 of the cages 15 are individually, manually raised and lowered in the guide channels 41 by means of levers 49, which have handles 50 at the top ends, and which are pivotally fastened at their bottom ends 51 to the tops of the respective discharge doors 16. The levers 49 are pivotally suspended intermediate their ends from fulcrum rods 52, the lower ends of which are pivotally connected to a point intermediate the ends of the levers 49 and the upper ends of which are pivotally fastened to the horizontal side beam 37.

A gate 53 is hinge mounted to the outside of each outside door guide 39 across the loading door 14 that controls access to the entry end 43 of the cage 15. The gate 53 is normally stowed parallel to the loading door 14 when it is not in use. To put a gate 53 into operation, its free end 54 is pivoted away from the loading door 14 to extend the gate 53 obliquely across the loading canal 9. This opens access to the loading door 14 and loading end 43 of the cage 15, and simultaneously blocks passage of the floating blocks of cheese 100 in the loading canal 9, deflecting the cheese blocks 100 inwardly through loading door 14 and into the cages 15.

The cages 15 are of very light and open construction, consisting of and open rectangular, stainless steel framework 55 made up of an open rectangular bottom frame 56 and an open rectangular top frame 57 that are joined on each corner and side by vertical struts 58 and 59. The top and bottom frames 57 and 56 are braced by transverse horizontal, top and bottom braces 60 and 61, respectively, which extend across the top and bottom frames 57 and 56, respectively, in alignment with the respective vertical struts 58 and 59. A plurality of horizontal, stainless steel bars 62 are welded to the insides of the struts 58 and 59, equally spaced apart and parallel to the top and bottom frames 57 and 56 to extend the full length of the cage framework 55 and provide ledges 62 for supporting a plurality of removable shelves 63.

The shelves 63 are made of stainless steel sheets the central, horizontal area 64 of which is perforated with large circular holes 65 to create as much open area as possible for vertical flow of brine 99 in the brining pit 1. Opposite side fences 66 and 67 of each shelf 63 are bent 90° downward to provide vertical supports for the shelves 63 and to enclose the sides of compartment 97 between and defined by the shelves 63 in the cages 15. Ends 68 of the vertical fences 66 and 67 of the shelves 63 are bent horizontally inward to provide feet 69 to rest on the ledges 62 on the vertical posts 58 and 59 of the cage frame 55. The ends of the ledges 62 have brackets 70 welded to them, so the brackets 70 project upwardly and inwardly over the tops of the feet 68 and 69 to hold the shelves 63 in position.

The horizontal central portions 64 of the shelves 63 have three equally spaced longitudinal ridges 71, 72 and 73, extending the entire lengths of the shelves 63 to provide rigidity. Each shelf 63 is made up of two, identical shelf members 74 and 75, each of which extends half the length of the cage 15. The shelf members 74 and 75 abut each other in the center of the cage 15, and are joined by stainless steel pins 76 and 77 that are welded in the ridges 71 and 73 of one shelf member 74. The pins 76 and 77 project from the ends of the shelf member 74 and into the ridges 71 and 73 of the other shelf member 75, where the ends of the interiors of the ridges 71 and 73 are closed to form triangular shaped holes by means of strips of sheet stock welded across the bottoms of the ridges 71 and 73. By forming each shelf 63 from two shelf members 74 and 75, removal of the shelf 63 is facilitated, because the shelf members 74 and 75 are short enough to fit in the space between the brining pit 1 and the brining room wall 7. Also, the shelf members 74 and 75 are light enough to be easily lifted and carried. Easy removal of the shelves 63 from the cages 15 facilitates cleaning, and allows the operator to enlarge the compartments 97 between the shelves 63 to accommodate larger blocks of cheese 100 by removing every other shelf 63.

The cages 15 are supplied with rings 79 and 80 welded to the centers of two intermediate top braces 60. Stainless steel cables 81 and 82 are attached to the rings 79 and 80 and from there to a power source (not shown) so that the cages 15 can be individually raised or lowered into the brining pit 1. The power source or sources for lifting the cages 15 may be hydraulic cylinders, hydraulic motors or electric motors, which need not be large or high powered since they never lift more than the weight of an empty cage 15. The cages 15 are at all times supported by the stainless steel cables 81 and 82 so that even in the lowest position the bottoms of the cages 15 are suspended a short distance above the floor 87 of the brining pit 1 to allow ample space for the clarified, reconstituted and cooled brine 99 from the manifold nozzles 33, 34 and 35 to flow unobstructed under the entire cages 15 and then upward through the perforations 65 in the shelves 63 to the surface of the brine 99 where it joins the horizontal streams 98.

In operation, after the curd is formed, kneaded, separated from the whey and pressed into shapes, which are typically six-pound loaves or 20-pound slabs, in the well-known manner, the blocks of cheese 100 are deposited by the belt conveyor 8 in the brine-filled loading canal 9 along the side of the brining pit 1. The pump 17 imparts powerful currents to the brine 99 that are focused into streams 98 by the canal 2. The stream 98 in the loading canal 9 propels and conveys the floating blocks of cheese 100 toward the blind end 42 of the brining tank 5 until they reach a gate 53 opened across the canal 9 opposite the cage 15 to be loaded. The operator will also have actuated the pneumatic cylinder 47 to open the adjacent loading door 14 so the gate 53 can deflect the floating cheese blocks 100 and part of the stream 98 into loading end 43 of the cage 15 in the compartment 97 between the shelves 63 that is at the surface of the brine 99.

When one compartment 97 in a cage 15 is filled to its capacity with blocks of cheese 100, the operator lowers the cage 15 into the brining pit 1 to submerge that compartment 97, and aligns the next higher compartment 97 with the surface of the brine 99. When all of the compartments 97 in that cage 15 are filled, the cage 15 will be completely submerged, and the operator closes its adjacent loading door 14 and gate 53. The blocks of cheese 100 floating with the stream 99 in the loading canal 9 then flow to next gate 53 opened by the operator where they are deflected through the opened loading door 14 into the bottom compartment 97 of the next cage 15 selected by the operator to be loaded.

When all of the cages 15 have been filled with cheese 100, or when the entire production run of cheese 100 is submerged in the brine 99, it is held there by the cages 15 while the vertical flow of brine 99 in the brining pit 1 carries heat away from the cheese 100 to the surface of the brine 99 and continually washes all of the surfaces of the blocks of cheese 100 with brine. Whenever there is cheese 100 anywhere in the brining tank 5, both the brine circulation pump 25 and the brine propulsion pump 17 must be operating. Thus the brining system of the present invention rapidly cools the blocks of cheese 100 to stop all biochemical action, producing cheese 100 having exactly the specified acidity. Also, the invention brines the cheese to the desired saltiness in a minimum time.

When the brining is completed, the operator can begin unloading the cages 15 in the same sequences as they were loaded. The loading and discharge doors 14 and 16 have distinct upper and lower halves 87, 88, 89, 90, respectively. The upper halves 87 and 88 of the loading and discharge doors 14 and 16 are solid, but the lower halves 89 and 90 are perforated to present an open grating through which the streams 98 of brine 99 can flow. By hoisting the cage 15 to be unloaded until the compartment 97 between the shelves 63 to be unloaded is partially above the surface of the brine, opening the adjacent discharge door 16 and raising the opposite loading door 14 so that the lower, perforated half 89 is at surface level, the blocks of cheese 100 will float with the resulting stream 98 out of the discharge end 43 of the cage 15 into the discharge canal 11. The stream 98 in the discharge canal 11 carries the floating cheese blocks 100 toward the access end 19 of the brining tank 5, where the belt conveyor 10 removes the cheese blocks 100 from the canal 2, and carries the blocks through a washer (not shown) to the wrapping machine (not shown). As each compartment 97 between the shelves 63 is thus emptied, the cage 15 is hoisted to lift the next compartment 97 partially above the surface of the brine 99 for unloading. This is repeated until the cage 15 is empty, and suspended above the brine 99 in the pit 1. Then the same procedure is followed with the next cage 15 until all cages 15 have been unloaded.

The brining system of the present invention may be designed so that each cage 15, or a given number of cages 15, will accommodate a batch of cheese. This feature enhances quality control and minimizes loss in the event of a bad batch or an inferior quality batch. When a cage 15 is filled to capacity, or to the desired extent, all of the cheese blocks 100 will be submerged in the brine pit 1. The continual flow of filtered, sterilized, reconstituted and cooled brine from the outlet nozzles 33, 34 and 35 into the bottom of the brining pit 1 creates a constance influx of fresh, cool brine 99, which rises vertically from the bottom of the brining pit 1 towards the surface of the brine 99, where the brine 99 is caught in the horizontal stream 98 created by the large capacity, brine propulsion pump 17. This stream 98 flows from the pump 17 through the loading canal 9 from where it branches with part flowing across the brining pit 1 through or over the cages 15, and part continues around the blind end canal 31 at the blind end 42 of the brining tank 5 and into the discharge canal 11. The brine stream 98 flows in the discharge canal 11 from the blind end 42 of the tank 5 towards its access end 19. When the stream 98 of brine 99 reaches the access end 19 of the tank 5, part of it spills over the top of the weir 23 into the brine reservoir 21 into and through the perforated basket 24, and the other part of the stream 98 is draw into the brine propulsion pump 17 which drives it back into the loading canal 9 to complete the circuit.

The portion of the brine 99 that spills into the brine reservoir 21, through the basket 24 is pumped out of the brine reservoir 21 through drain pipe 83 by the circulation pump 25. The brine is pumped through the fine filter 27, to remove any solids remaining in it, and through the ultraviolet sterilizer 28, which kills any microorganisms that may enter the brine 99 with the cheese blocks 100 or form the ambient air. From the sterilizer 28, the brine is pumped to the make-up tank 29 where additional salt is added, if needed, to restore the brine to optimal concentration. The brine flows from the brine make-up tank 29, through the heat exchanger 30 where it is cooled to the desired temperature, and into the manifold pipe 32 adjacent the brine pit 1, and it is pumped out of the manifold pipe 32 through the outlet nozzles 33, 34 and 35 into the bottom of the brining pit 1 beneath the cages 15 to repeat its circulation.

Sanitation is extremely important in the processing and handling of dairy products and though cheese tends to purify itself, sanitation is nevertheless important to preserve good quality. A brining system embodying the present invention readily lends itself to cleaning, both because the shelves 63 in the cages 15 are easily disassembled and removed for cleaning, and because the brine 99 is continually recirculated, filtered and sterilized. In addition, mixing the salt into the brine 99 in the brine make-up tank 29 instead of the brining pit was done before the invention of U.S. Pat. No. 3,910,174 prevents impurities in the salt from getting into the brining pit, and also prevents salt from settling out in the bottom of the brining pit. Nevertheless, after extended periods of usage, such as a week, it is desirable to the preservation of high standards of sanitation to empty the brining pit and thoroughly clean the entire system. A system embodying the present invention readily lends itself to automatic CIP (clean in place) systems. After the brine has been emptied from the brining pit 1, the brine reservoir 21 and the brine reconstituting circuit, which includes the pump 25, the fine filter 27, sterilizer 28, make-up tank 29, and heat exchanger 30, CIP fluids can be pumped through the brine reconstituting circuit in the opposite direction from the normal brine flow to clean thoroughly all of the inside surfaces of conduit 83, 32, 33, 34, 35, filters 24 and 27, sterilizer 28, the brine make-up tank 29, the heat exchanger 30, the brine reservoir 21 and the brining pit 1.

I claim:

1. A system for brining and cooling buoyant blocks of cheese comprising the combination of:
    a brining pit for holding cooled brine;
    a cage immersible in said brining pit, said cage having an open structure to permit flow of brine through it, separate compartments for containing cheese to be cooled and brined, a loading end for receiving said blocks of cheese adjacent one side of said brining pit, and a discharge end for discharging said blocks of cheese adjacent another side of said brining pit;
    means for hoisting said cage to the surface of said brine to receive and discharge said blocks of cheese floating on said surface and submerging said cage beneath said brine to submerge said blocks of cheese in said brine for cooling and brining;
    means to convey said blocks of cheese to said loading end of said cage;
    means to convey said blocks of cheese away from said discharge end of said cage;
    means to float said blocks of cheese into said cage at said loading end;
    and means to float said blocks of cheese out of said discharge end of said cage.

2. A system for brining and cooling buoyant blocks of cheese as set forth in claim 1, wherein:
    a brine filled canal surrounds and communicates with said brining pit, and a brine propulsion means in said canal imparts a horizontal current to said brine near its surface to create a continuously flowing stream of brine through said canal;
    said means to convey said blocks of cheese to said loading end of said cage including said stream in a portion of said canal flowing past said loading end of said cage, a normally closed loading door between said canal and said loading end of said cage, and means for opening said loading door;
    said means to float said cheese into said cage including a retractable gate to extend across said canal at said door to deflect current from said stream and cheese floating in said stream into said cage.

3. A system for cooling and brining buoyant blocks of cheese as set forth in claim 2, wherein:

said means to carry said blocks of cheese away from said discharge end of said cage includes a portion of said stream in said canal flowing past the discharge end of said cage to carry said blocks of cheese away from said cage;

and said means to float said blocks of cheese out of said discharge end of said cage includes a normally closed discharge door between said portion of said stream in said canal and said discharge end of said cage, and means for opening said door to allow said cheese in said cage to float into said stream.

4. A system for brining and cooling buoyant blocks of cheese as set forth in claim 1, wherein:

said cage includes a framework spanning the width and depth of said brining pit and containing a plurality of open ended horizontal shelves having a plurality of holes through them and vertical fences on each side to define a plurality of said compartments with open loading and discharge ends for receiving and discharging said floating blocks of cheese.

5. A system for brining and cooling buoyant blocks of cheese comprising the combination of:

a brining pit adapted to contain cooled brine;

a cage mounted for vertical travel into and out of said brining pit, and having an open framework supporting a plurality of horizontal shelves defining compartments for containing said blocks of cheese, said horizontal shelves having a plurality of openings through them to allow vertical circulation of brine through said compartments;

and a brine recirculating circuit for continuously removing a portion of said brine near its surface, and expelling said portion of brine into said brining pit beneath said cage in said brining pit to force said brine to flow continuously vertically through said openings in said shelves and about said cheese in said compartments.

6. A system for brining and cooling buoyant blocks of cheese as set forth in claim 5, wherein:

the open framework of said cages has rectangular top and bottom horizontal frames joined by vertical struts, and open means on said vertical struts for supporting said shelves; and said horizontal shelves have vertical sides engaging said means for supporting said shelves on said vertical struts to hold said shelves in position and enclose sides of said compartments.

7. A system for brining and cooling buoyant cheese as set forth in claim 5, wherein:

said circuit for recirculating a portion of said brine includes means for imparting a horizontal current near the surface of said brine, a weir over which a portion of said brine surface can spill out of said brining pit, a reservoir to receive said portion of said brine spilling over said weir, and a conduit with a pump connected to pump said brine from said reservoir through a filter and a sterilizer and a brine mixing tank and a cooling means, and a plurality of nozzles to expel said brine into the bottom of said brining pit at a plurality of spaced apart locations.

8. A brine circulation system for a cheese brining and cooling system, comprising the combination of:

a brining tank filled with brine and having a relatively deep centrally located brining pit with a relatively shallow canal surrounding the outside of said brining pit and contiguous with said brining pit;

a brine propulsion means located near the surface of said brine in said canal to impart a horizontal current to said brine through said canal;

a brine reservoir adjacent to said brining tank having a weir lower than the surface of said brine between said brine reservoir and said brining tank to allow a surface portion of said brine to spill from said brining tank into said brine reservoir;

a conduit from said reservoir connected to a pump to pump said brine from said brine reservoir and through said conduit, and means connected to said conduit for sanitizing, reconstituting and cooling said brine;

and a manifold connected to said conduit to receive sanitized, reconstituted and cooled brine and having a plurality of nozzles located to expel said brine into said brining tank at a plurality of spaced apart locations across the bottom of said brining tank to create a vertical current from the bottom of said brining tank to the surface of said brine.

* * * * *